(12) United States Patent
AlSalman et al.

(10) Patent No.: US 8,885,193 B2
(45) Date of Patent: Nov. 11, 2014

(54) BRAILLE-TO-BRAILLE FACSIMILE MACHINE USING IMAGE PROCESSING

(75) Inventors: AbdulMalik S. AlSalman, Riyadh (SA);
Ahmed I. AlJardan, Riyadh (SA);
Abdu Hasan Abdu Gumaei, Riyadh (SA)

(73) Assignee: King Saud University, Riyadh (SA)

( * ) Notice: Subject to any disclaimer, the term of this patent is extended or adjusted under 35 U.S.C. 154(b) by 350 days.

(21) Appl. No.: 13/270,222

(22) Filed: Oct. 10, 2011

(65) Prior Publication Data
US 2013/0088747 A1     Apr. 11, 2013

(51) Int. Cl.
*G06F 3/12* (2006.01)
*H04N 1/00* (2006.01)
*G09B 21/02* (2006.01)
*B41J 3/32* (2006.01)
*G06K 9/52* (2006.01)
*G06K 9/40* (2006.01)

(52) U.S. Cl.
CPC ............ *H04N 1/00* (2013.01); *H04N 1/00127* (2013.01); *H04N 2201/0093* (2013.01); *G09B 21/02* (2013.01)
USPC ........ 358/1.15; 400/109.1; 382/206; 382/274

(58) Field of Classification Search
CPC ............ G09B 21/00; G09B 21/02; B41J 3/32
See application file for complete search history.

(56) References Cited

U.S. PATENT DOCUMENTS

| 5,193,921 A * | 3/1993 | Tsukuda et al. ........... 400/109.1 |
| 5,920,649 A * | 7/1999 | Yasuda et al. ................. 382/206 |
| 7,419,317 B2 * | 9/2008 | Akaiwa ...................... 400/109.1 |
| 2005/0129283 A1 * | 6/2005 | Butler et al. .................. 382/114 |

OTHER PUBLICATIONS

American Thermoform Corporation Product Catalog, 1758 Brackett Street, La Verne, CA 91750, 2011, 3 pp.
Fact Sheet on Braille Writers, Printers and Software, American Printing House for the Blind (APH), 1830 Frankfurt Avenue, Louisville, KY 40206, http://www.aph.org, 2004, 22 pp.
Weber, et al., "Interactive Analysis of Fax Documents", Max Lange, Blista Brailletec GMBH, Germany, 1997-1999, 20 pp.
Jaquiss, Robert "The Thoughts of Robert Jaquiss on a Braille Fax", Dec. 7, 1993, 2 pp.

* cited by examiner

*Primary Examiner* — Vincent Rudolph
*Assistant Examiner* — Neil R McLean
(74) *Attorney, Agent, or Firm* — Hart IP Law & Strategies

(57) ABSTRACT

A Braille-to-Braille facsimile machine implemented process scans an original Braille document, obtaining an image of the original Braille document. The image of the original Braille document is processed, producing an extracted Braille image and duplicating formatting of the original Braille document to produce a copy of the original Braille document. The copy of the original Braille document is sent, via a communications link and received. The copy of the original Braille document is then printed.

17 Claims, 16 Drawing Sheets

*~400*

| Combination | Table Index | ASCII Code | Cell | Combination | Table Index | ASCII Code | Cell |
|---|---|---|---|---|---|---|---|
| 0 | 0 | 64 | | 1 | 32 | 65 | |
| 6 | 1 | 96 | | 16 | 33 | 97 | |
| 5 | 2 | 68 | | 15 | 34 | 69 | |
| 56 | 3 | 100 | | 156 | 35 | 101 | |
| 4 | 4 | 80 | | 14 | 36 | 81 | |
| 46 | 5 | 112 | | 146 | 37 | 113 | |
| 45 | 6 | 84 | | 145 | 38 | 85 | |
| 456 | 7 | 116 | | 1456 | 39 | 117 | |
| 3 | 8 | 66 | | 13 | 40 | 67 | |
| 36 | 9 | 98 | | 136 | 41 | 99 | |
| 35 | 10 | 70 | | 135 | 42 | 71 | |
| 356 | 11 | 102 | | 1356 | 43 | 103 | |
| 34 | 12 | 82 | | 134 | 44 | 83 | |
| 346 | 13 | 114 | | 1346 | 45 | 115 | |
| 345 | 14 | 86 | | 1345 | 46 | 87 | |
| 3456 | 15 | 118 | | 13456 | 47 | 119 | |

*Fig. 4A*

| Combination | Table Index | ASCII Code | Cell | Combination | Table Index | ASCII Code | Cell |
|---|---|---|---|---|---|---|---|
| 2 | 16 | 72 | ⠂ | 12 | 48 | 73 | ⠃ |
| 26 | 17 | 104 | ⠢ | 126 | 49 | 105 | ⠣ |
| 25 | 18 | 76 | ⠊ | 125 | 50 | 77 | ⠋ |
| 256 | 19 | 108 | ⠪ | 1256 | 51 | 109 | ⠫ |
| 24 | 20 | 88 | ⠆ | 124 | 52 | 89 | ⠇ |
| 246 | 21 | 120 | ⠦ | 1246 | 53 | 121 | ⠧ |
| 245 | 22 | 92 | ⠎ | 1245 | 54 | 93 | ⠏ |
| 2456 | 23 | 124 | ⠮ | 12456 | 55 | 125 | ⠯ |
| 23 | 24 | 74 | ⠒ | 123 | 56 | 75 | ⠓ |
| 236 | 25 | 106 | ⠲ | 1236 | 57 | 107 | ⠳ |
| 235 | 26 | 78 | ⠚ | 1235 | 58 | 79 | ⠛ |
| 2356 | 27 | 110 | ⠺ | 12356 | 59 | 111 | ⠻ |
| 234 | 28 | 90 | ⠖ | 1234 | 60 | 91 | ⠗ |
| 2346 | 29 | 122 | ⠶ | 12346 | 61 | 123 | ⠷ |
| 2345 | 30 | 94 | ⠞ | 12345 | 62 | 95 | ⠟ |
| 23456 | 31 | 126 | ⠾ | 123456 | 63 | 127 | ⠿ |

*Fig. 4B*

BRAILLE-TO-BRAILLE FACSIMILE MACHINE USING IMAGE PROCESSING

BACKGROUND

Braille is a very important method of communication for the blind or people with low vision. Heretofore, facsimile transmission of a Braille document in a manner analogous to faxing of a conventionally printed or written document has not been possible. Communication of a Braille document from one location to another has required physical delivery of the Braille document or its reproduction employing a number of disparate, oftentimes specialized, devices and specialized software packages. Such specialized software (i.e. Braille translation software, or the like) is often language dependent which can be a hurtle to communications of Braille documents. Further, such software typically supposes that spacing between adjacent characters in the same character line and between adjacent character lines in a Braille document is regular, which can be an impediment in translating misaligned or skewed documents, such as might result from facsimile scanning and/or transmission.

SUMMARY

The described systems and methods relate to a Braille-to-Braille facsimile machine and implemented processes that scan an original Braille document, obtaining an image of the original Braille document. The image of the original Braille document is processed, producing an extracted Braille image and duplicating formatting of the original Braille document to produce a copy of the original Braille document. The copy of the original Braille document is sent, via a communications link and received. The copy of the original Braille document is then printed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In the Figures, the left-most digit of a component reference number identifies the particular Figure in which the component first appears.

FIG. 4A shows an example first section of an ASCII-Braille lookup table, according to one embodiment.

FIG. 4B shows an example second section of an ASCII-Braille lookup table, according to one embodiment.

DETAILED DESCRIPTION

Overview

Figure 1:
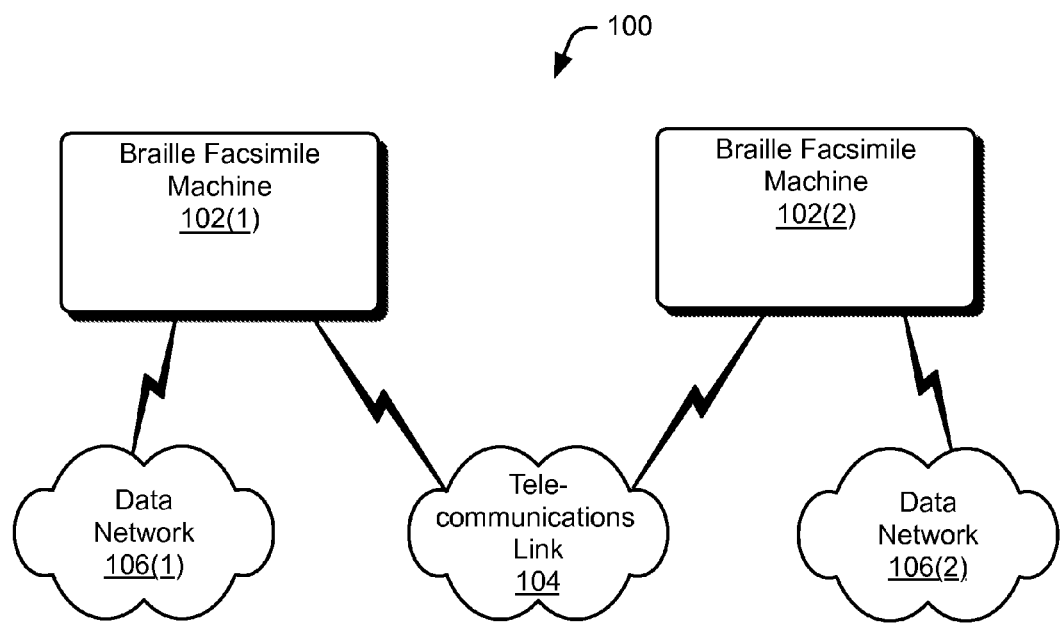
FIG. 1 illustrates an example environment capable of implementing the systems and methods described herein, according to one embodiment.

The systems and methods described herein relate to a Braille facsimile machine and methods for processing, sending and receiving single or double-sided Braille documents, particularly for Braille-to-Braille faxing. Processing of a Braille document for faxing may employ image segmentation, image deskewing rotation, and/or grid formation for dot detection to extract a Braille image. On the other hand, processing of a received Braille facsimile may employ vertical and horizontal lines generation and/or Braille cell detection to output an image of detected Braille cells.

One implementation of a Braille facsimile machine may be comprised of a main image processing board, such as, by way of example, a computer motherboard or the like, connected to an image scanner, which may take the form of a flatbed-type scanner. Such flatbed scanners are typically more practical for scanning Braille documents than a sheet feed-type scanner, particularly given the heavy paper Braille documents are embossed upon and the difficulty that may be associated with sheet feeding such heavy paper embossed with raised dots. However, the present systems and methods may alternatively use a sheet feed-type scanner, particularly one well adapted to handle heavy, embossed paper. Implementations of the present Braille facsimile machine also include a Braille printer, commonly referred to as a Braille embosser and a facsimile system, such as may be comprised of a facsimile modem card connected with a telephone line. Such implementations may also include a network interface, such as may be provided by a network card, or the like, and one or more control switches, by which a user may initialize a Braille facsimile or copy and/or select single or double sided faxing.

The primary processes carried out by the present Braille facsimile machine may include scanning a Braille document, image pre-processing, sending the Braille facsimile via a communications link, receiving facsimiles via the communications link, image post-processing, and Braille printing/embossing. In accordance with various implementations of the present systems and methods, image processing is divided into two sub-processes. One sub-process is referred to herein as image "pre-processing," which according to assorted implementations is carried out by a sending Braille facsimile machine. The other sub-process is referred to herein as "post-processing," which according to assorted implementations is carried out by a receiving Braille facsimile machine. Such splitting of image processing may accelerate the Braille facsimile transmission. However, in accordance with alternative implementations, either Braille facsimile machine may carry out both the pre-processing and the post-processing.

In accordance with one implementation, to send Braille document using the present Braille facsimile machine, a user places the Braille document in the machine's scanner, inputs the receiving facsimile number and presses the machines send switch. The machine then scans the Braille paper and converts it to Braille scanned image in accordance with various implementations of the present systems and methods. Once the Braille document has been scanned, the main image processing board reads and processes the Braille scanned image, generating a binary image of extracted Braille dots. In this extracted Braille image, the background may be black with white Braille dots. The facsimile system then sends the extracted Braille image as electronic signals through the phone line, in a more- or less conventional manner, to the Braille facsimile machine specified by the facsimile number.

In accordance with implementations of the present systems and methods, a Braille facsimile machine receiving an incoming Braille facsimile receives the incoming signal, and translates it back into the aforementioned binary image of the extracted Braille dots, which may have a black background with white dots. The binary image is then read and processed by the main image processing board of the receiving Braille facsimile machine. In accordance with various embodiments of the present systems and methods the extracted Braille image may be divided into lines of Braille cells that may then be translated into Braille code. The Braille code may then be printed by the Braille facsimile machines printer/embosser, line by line.

Previous methods suppose that the space between adjacent characters in the same character line and between adjacent character lines is regular. The present techniques for image processing are adaptive and flexible to deal with the space between Braille dots, Braille cells, and Braille lines, which may be adjusted after image segmentation.

This machine can be up to 4-in-1 device: a Braille copier; a Braille-to-Braille fax; a Regular phone; a Braille-to-text translator. The first function (Braille copier) is based on U.S. patent application Ser. No. 12/832,612, entitled Braille Copy Machine Using Image Processing Techniques, filed Jul. 8, 2010. The latter function (Braille-to-text translator) uses software to translate the scanned Braille image to a specific language (language dependent). This latter function also uses a regular printer embedded with the device to print the resulted text (or to use a Braille-text embosser, such as Gemini Embosser).

An Exemplary System for Braille Facsimile Transmission

FIG. 1 illustrates example environment 100 capable of implementing the systems and methods described herein, according to one embodiment. Environment 100 includes two Braille facsimile machines 102(1) and 102(2) such as described below with respect to FIG. 2. Braille facsimile machines 102(1) and 102(2) are connected via one or more communications links, such as telecommunications link 104, which may be the Plain Old Telephone Service (POTS) network, and/or the like. Each of Braille facsimile machines 102(1) and 102(2) may also be connected to a same or different data networks 106(1) and 106(2), such as a Local Area Network (LAN), Wide Area Network (WAN), the Internet, and Intranet, or the like, such as to provide the one or more communications links.

Only two Braille facsimile machines 102(1) and 102(2) are shown in FIG. 1, however, environment 100 may comprise any number of Braille facsimile machines. Also, although Braille facsimile machines 102(1) and 102(2) are each illustrated as a unitary device, one or both Braille facsimile machines 102(1) and 102(2) may take the form of a general purpose processor-based computer system operatively connected to peripherals, which may provide a facsimile system, such as a scanner, a facsimile modem, Braille embosser, and/or the like.

An Exemplary Braille Facsimile Machine

Figure 2:
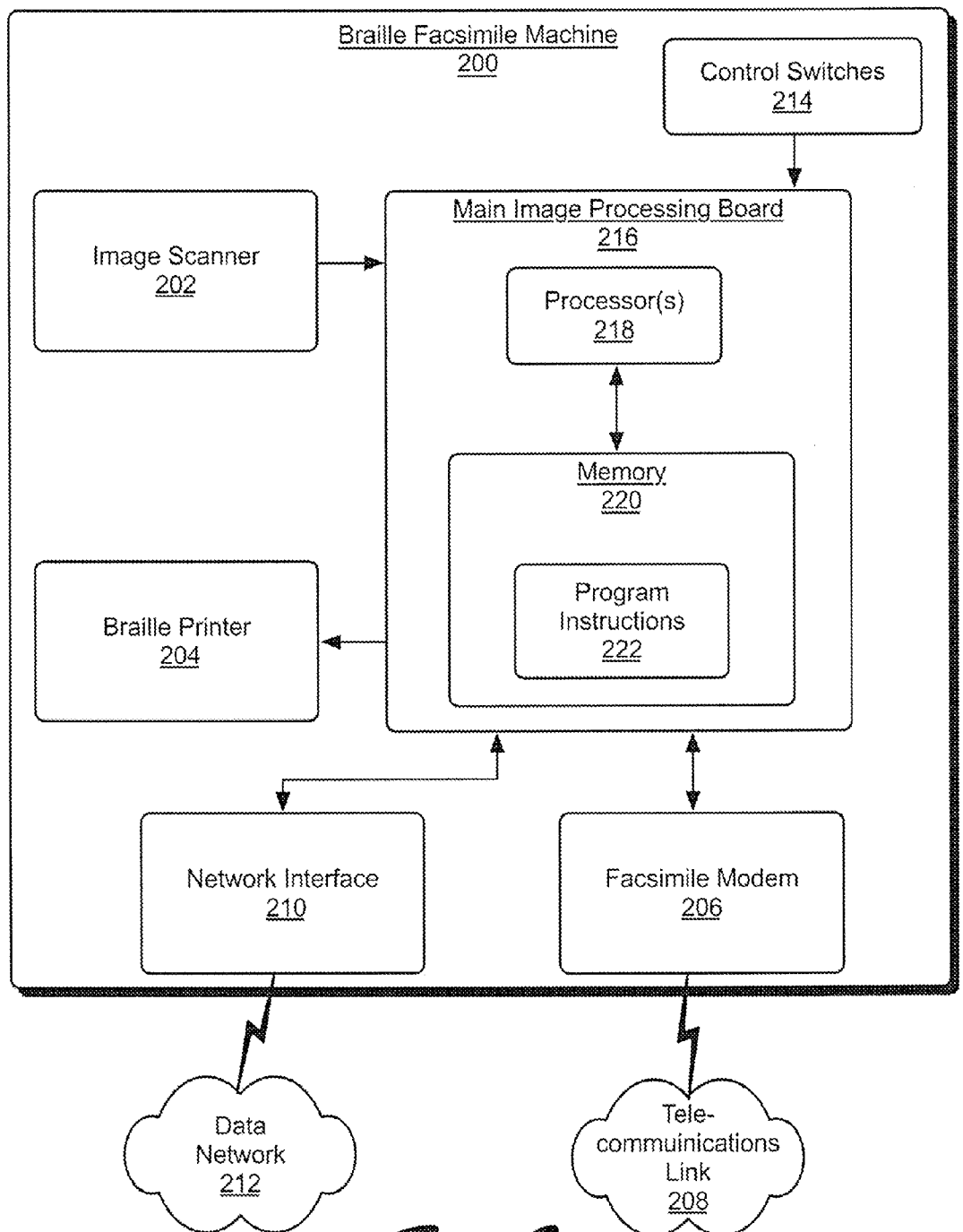
FIG. 2 is a block diagram illustrating an example Braille facsimile machine, according to one embodiment.

FIG. 2 is a block diagram-illustrating example Braille facsimile machine 200, according to one embodiment. In accordance with the illustrated implementation, Braille facsimile machine 200 is comprised of image scanner 202, Braille printer 204 and facsimile modem 206 connected to telecommunications link 208. Image scanner 202 may be a flatbed-type scanner, a scanner with an automatic document feeder (ADF), or the like, incorporated into Braille facsimile machine 200. Alternatively, scanner 202 may be a sheet feed-type scanner adapted to handle heavy embossed Braille documents. Braille printer 204 may be a Braille embosser or the like.

As noted above, with respect to FIG. 1, facsimile modem 206 may be connected to a telephone line, such as provided by the POTS network, or the like, to provide telecommunications link 208. Facsimile machine 200 might also include network interface 210 linked to one or more data communications networks 212, and one or more control switches 214, by which a user may initialize a Braille facsimile or copy and/or select single or double sided faxing. For example, a user may select to only send one side, or both sides of a double-sided Braille document employing one or more of switches 214. In accordance with illustrated facsimile machine implementation 200, main image processing board 216 is operatively coupled to image scanner 202, Braille printer 204, facsimile modem 206 network interface 208 and control switch(es) 214. Main image processing board 216 comprises one or more respective processors 218 operatively coupled to memory 220. Each memory 220 comprises computer program instructions 222 executable by one or more processor(s) 218 to implement methods for Braille-to-Braille facsimile transmission and/or reception, e.g., such as described below with respect to processes 300, 500, 600 and/or 700, illustrated in FIGS. 3, 5, 6, and 7, respectively.

For purposes of illustration, programs and other executable program components are shown herein as discrete blocks, although it is understood that such programs and components may reside at various times in different storage components of facsimile machine 200, and are executed by processor(s) 218. Alternatively, the systems and procedures described herein can be implemented in independent but operatively coupled hardware, a combination of hardware and software, and/or firmware. For example, one or more application specific integrated circuits (ASICs) can be programmed to carry out one or more of the systems and procedures described herein.

An Exemplary Process for Braille Facsimile Transmission and Reception

Figure 3:
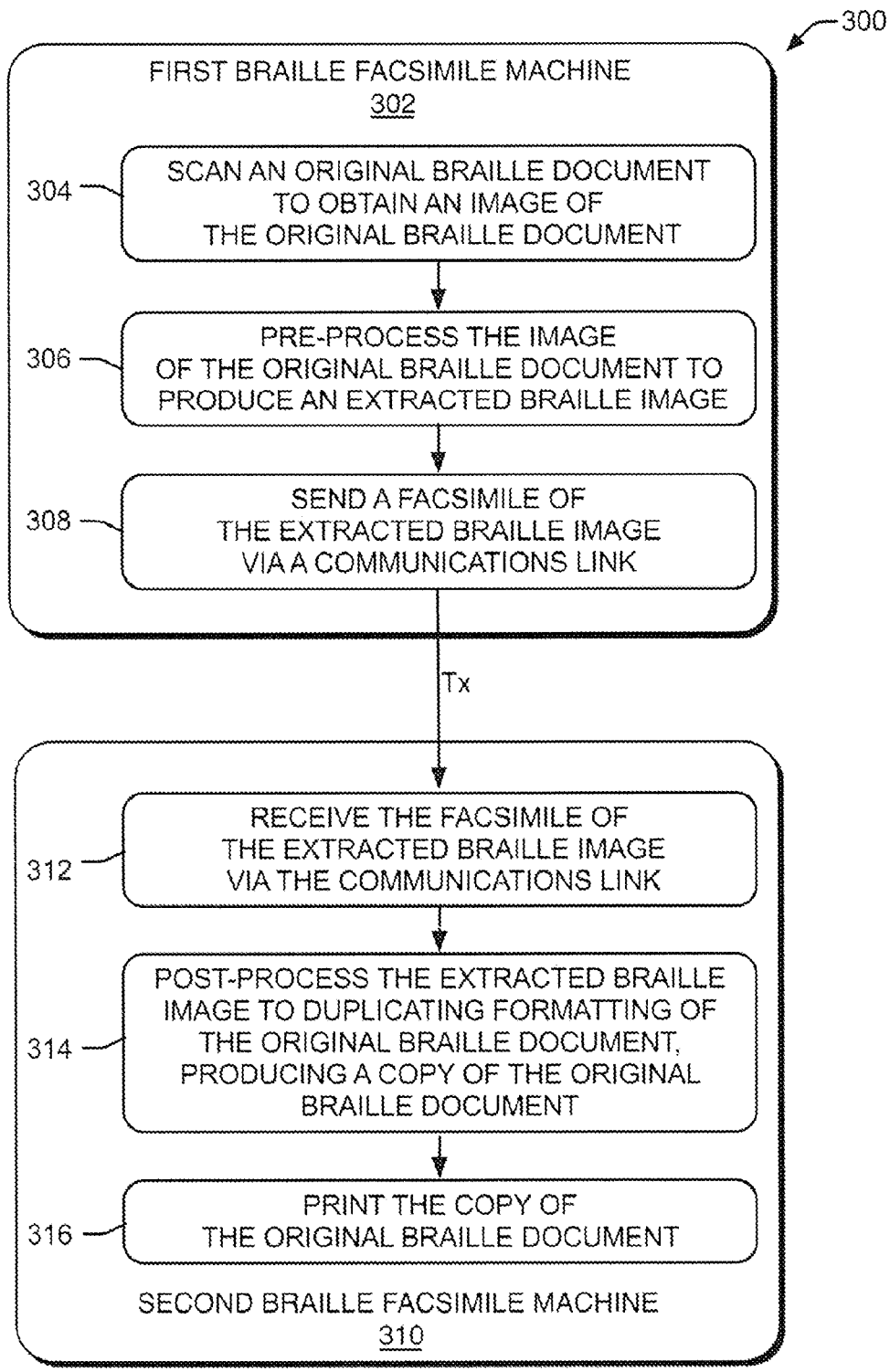
FIG. 3 shows an example procedure for Braille image processing and facsimile transmission, according to one embodiment.

FIG. 3 shows example procedure 300 for Braille image processing and facsimile transmission, according to one embodiment. A first Braille facsimile machine 302, such as facsimile machine 200 described above, which may be one of Braille facsimile machines 102(1) of a Braille facsimile system such as illustrated in environment 100 of FIG. 1 scans an original Braille document, obtaining an outgoing image of the original Braille document, at 304. This scanning of a Braille document is the first step to capture the original Braille document that is to be faxed. Any number of devices, such as a flatbed scanner, a digital camera, and/or the like can be used to perform this step. In accordance with various implementations, the use of a flatbed scanner for image acquisition is a cost-effective solution. In such an implementation, the original Braille page is scanned using a flatbed scanner at, such as by way of example, at 150 dpi resolution, and a color setting to acquire a grey level Braille image.

Illumination of the Braille document during scanning may be non-uniform, i.e. there is only one light source in the scanner and at a slight distance from the image sensor (CCD). Such a scan results in an image of the Braille document wherein the Braille dots cast shadows. The original Braille document may be two sided and scanning at 304 may produce an image reproducing both sides of the original Braille document. In a single sided Braille image, the dots are referred to as recto dots, which extend outward from the Braille document. In a double-sided Braille image, there are two types of dots, recto dots, extending outward from the Braille document and verso dots, extending inward from the facing document surface. In a scanned image, a light region that exists above a dark region, while a verso dot may be identified by a light region that exists below a dark region may identify a recto dot.

After image acquisition at 304, the outgoing image of the original Braille document is pre-processed at 306 by the first facsimile machine 302, producing an outgoing extracted Braille image. Any number of image processing techniques can be applied as a pre-processing stage to process Braille dots in the scanned Braille image. These techniques may include image segmentation, image-deskewing rotation, grid formation for dot detection, and/or Braille image extraction. These and other image processing techniques are described in U.S. patent application Ser. No. 12/832,612, entitled Braille Copy Machine Using Image Processing Techniques, filed Jul. 8, 2010, which is incorporated herein by reference.

For example, image segmentation may be performed to classify the pixels of the scanned image as one of the three modes, e.g., the dark region of a dot, the light region of a dot, or background. As one of ordinary skill in the art will appreciate, the cells in a Braille document are arranged in horizontal and vertical directions. Hence, the dots in Braille document are also arranged in horizontal and vertical directions. As a result of scanning, such as at 304, the cells may be skewed, that is, the cells and dots may not align. Therefore, the present systems and methods may adjust Braille image skew as a part of pre-processing to insure greater accuracy in delivering a facsimile.

In accordance with aspects of the present systems and methods, skew of the scanned Braille document image may be corrected using an approach that segments the Braille image, detects the Braille cells, finds the rotation angle of Braille image, such as discussed below with respect to FIG. 6. Additionally or alternatively, other processes for deskewing rotation of the scanned Braille image may be performed by the processor. For example, the processor may use a binary search algorithm to arrange Braille cells containing dots in horizontal and vertical directions, wherein the image is rotated and the number of dots aligning is evaluated to find the orientation where the greatest numbers of dots align.

As noted above, the present systems and methods support double-sided Braille document facsimile transmission in one transmission step, without scanning and processing each side of the Braille document separately. This capability also provides faster facsimile delivery. As noted above, one side of a double-sided Braille document has two types of dots, recto (front) dots and verso (back) dots. In pre-processing at 306 a recto dot may be detected where a light region exists above a dark region, while a verso dot may be detected where a light region exists below a dark region. An extracted Braille image resulting from pre-processing at 306 may be a binary image, which may have black background and white Braille dots.

A facsimile of the outgoing extracted Braille image is sent at 308 by first facsimile machine 302, via a communications link, such as telecommunications link 104/208 discussed above (e.g. the POTS network) or via data network 106/212. In accordance with implementations of the present systems and methods, any number of Braille pages may be scanned at 304, pre-processed at 306 and transmitted at 308, in one transmission, without re-dialing the fax number for each Braille page to be sent. This capability also insures fast facsimile delivery.

Additionally, implementations of the present systems and methods may send a Braille document, of one or more pages, to one or many locations (i.e. to any number of fax numbers) at 308, with only one scanning (304) and one pre-processing (306) step. A user need only dial (or program) the receiving fax number to send the document to each dialed (or programmed) number. This capability also insures fast delivery of faxes.

With respect to two-sided Braille documents, two extracted binary images are sent at 308 in one transmission step (without re-scanning or separate pre-processing, as discussed above). In other words, when a user chooses to send a double-sided Braille document, the present systems and methods call for scanning the document at 304, pre-processing both the recto and verso dots of the scanned document at 306, generating two binary images of extracted Braille dots (front recto Braille dots and back verso Braille dots) for each page. As mentioned in accordance with certain implementations the image may be dark and Braille dots may be white in this extracted image. Regardless, the two extracted images for each page are transmitted at 308, e.g., in one transmission step.

Second Braille facsimile machine 310, such as another facsimile machine 200 described above, which may be the other Braille facsimile machine 102(2) of a Braille facsimile system such as illustrated in environment 100 of FIG. 1, receives the incoming facsimile(s) of the extracted Braille image at 312, via the communications link.

The incoming extracted Braille image is post-processed at 314, by second facsimile machine 310, duplicating formatting of the original Braille document to produce a copy of the original Braille document. Any number of image processing techniques can be applied as post-processing at 314 to process Braille dots in the incoming extracted Braille image. For example, this post-processing may include negatively transforming the extracted Braille image to produce an extracted Braille image having black Braille dots on a white background. Further or alternatively, this post processing may include detecting Braille cells in the extracted Braille image, such as by generating horizontal and vertical lines based on Braille dots in the extracted Braille image. As noted above, the original Braille document may be two sided and the post-processing at 314 may include duplicating formatting of each side of the original of the incoming Braille document.

At 316, the copy of the original Braille document is printed, such as by embossing, by the second facsimile machine. A lookup table, such as table 400 shown in FIGS. 4A and 4B, of possible combinations of Braille dots in each cell starting from zero dots (no raised dots) to six raised dots may be employed at 316. The mappings shown in the table of FIGS. 4A and 4B are not associated with any particular language. Thus, the present systems and methods are not language specific; that is, the present systems and methods may be considered language independent. The detected cells from 314 are composed of zero or more dots the position of the dots within the detected cells are used during printing to identify the ASCII code of the cell. The corresponding number in this table is sent as a character to the embosser to print the corresponding Braille cell at 316. Thereby, the ASCII code is converted to appropriate characters, which represent Braille codes used by the Braille embosser for printing at 316, line by line, preserving all the formats of the original Braille image.

An Alternative Exemplary Process for Braille Facsimile

Figure 5:
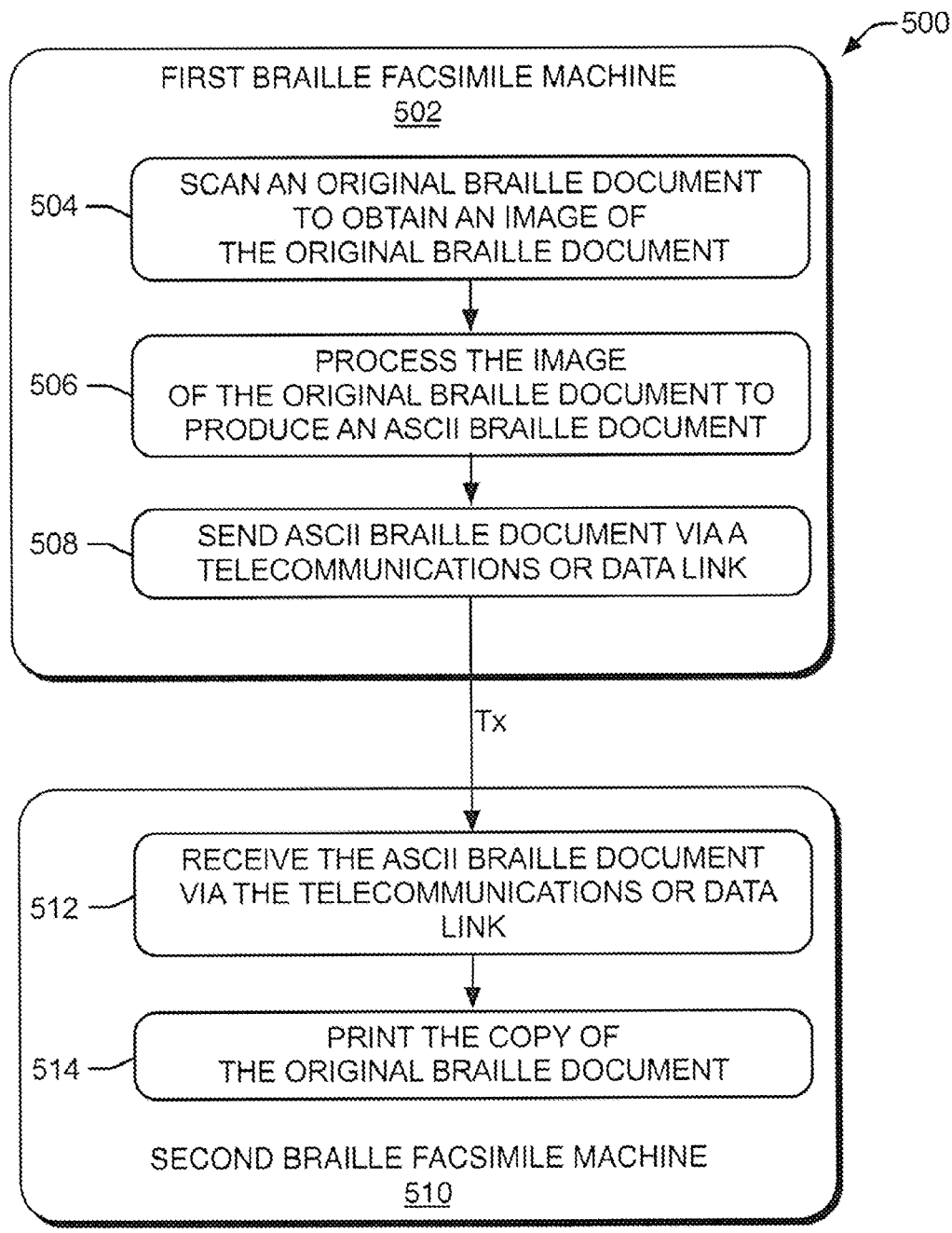
FIG. 5 shows an alternative example procedure for Braille image processing and facsimile transmission, according to one embodiment.

Alternative implementations of the present systems and methods allow pre-processing and/or post processing to be carried out in either the sending or the receiving facsimile machine Thus, as a further example, FIG. 5 shows alternative example procedure 500 for Braille image processing and facsimile transmission, according to one embodiment. Therein, a first Braille facsimile machine 502, such as facsimile machine 200 described above, which may be one of Braille facsimile machines 102(1) of a Braille facsimile system such as illustrated in environment 100 of FIG. 1 scans an original Braille document, obtaining an outgoing image of the original Braille document, at 504. Again, any number of devices, such as a flatbed scanner, a digital camera, and/or the like can be used to perform this step. The original Braille document may be two sided and scanning at 504 may produce an image reproducing both sides of the original Braille document, as discussed above.

After image acquisition at 504, the outgoing image of the original Braille document is processed at 506 by the first facsimile machine Such processing may include image processing included in steps such as discussed above with respect to pre-processing and post-processing steps, 306 and 314, respectively. In accordance with the implementation of procedure 500 illustrated, processing at 506 produces ASCII Braille code or the like for transmission at 508.

Any number of image processing techniques can be applied at 506 to process Braille dots in the scanned Braille image to duplicate formatting of the original Braille document. These techniques may include image segmentation, image deskewing rotation, grid formation for dot detection, Braille image extraction, and/or detecting Braille cells in the extracted Braille image, such as by generating horizontal and vertical lines based on Braille dots in the extracted Braille image to produce a copy of the original Braille document. These techniques are discussed above with respect to steps 308 and 314 of procedure 300. Also, some of these and other image processing techniques are described in U.S. patent application Ser. No. 12/832,612, incorporated herein by reference above. A lookup table, such as table 400 shown in FIGS. 4A and 4B, of possible combinations of Braille dots in each cell starting from zero dots (no raised dots) to six raised dots may be employed at 506 to assign ASCII Braille codes for each Braille cell of the processed document. Similar to as discussed above, the detected cells are composed of zero or more dots. The positions of the dots within the detected cells are used to identify the ASCII code of the cell. The corresponding number in table 400, or the like is set for the corresponding Braille cell at 506. Thereby, the extracted Braille document is converted to ASCII code at 506, preserving formatting of the original Braille document.

At 508, the ASCII Braille code derived at 506 is sent via a communications link, such as telecommunications link 104/208 discussed above (e.g. the POTS network), or sent via one or more networks, such as data networks 106(1) and 106(2) or 212, discussed above. In accordance with implementations of the present systems and methods any number of Braille pages may be scanned at 504, processed at 506 and sent at 508, in one transmission. Additionally, implementations of the present systems and methods may send a Braille document, of one or more pages, to one or many locations at 508, with only one scanning (504) and one processing (506) step. With respect to two-sided Braille documents, two sets of ASCII Braille codes may be sent at 508 in one transmission step (without re-scanning or separate processing). In other words, when a user chooses to send a double-sided Braille document, the present systems and methods call for scanning the document at 504, processing both the recto and verso dots of the scanned document at 506, generating two binary images of extracted Braille dots (front recto Braille dots and back verso Braille dots) for each page and separate sets of ASCII Braille codes for each side of the page.

Second Braille facsimile machine 510, such as another facsimile machine 200 described above, which may be the other Braille facsimile machine 102(2) of a Braille facsimile system such as illustrated in environment 100 of FIG. 1, receives the incoming ASCII Braille code at 512, via the telecommunications link or data network.

At 514, a lookup table, such as table 400 shown in FIGS. 4A and 4B may be employed to derive a copy of the original Braille document for printing at 516, such as by embossing, by the second facsimile machine. As noted above, the detected cells from 506 are composed of zero or more dots. At 514, the ASCII code of each cell, that is, the position of the dots within the detected cells, are sent as a character to the embosser to print the corresponding Braille cell. Thereby, the ASCII code is converted to appropriate characters, which represent Braille codes used by the Braille embosser for printing at 516, line by line, preserving all the formatting of the original Braille document. As discussed above, the mapping shown in the table of FIGS. 4A and 4B are not associated with any particular language. Thus, the present systems and methods are not language-specific. Accordingly, the present systems and methods may be considered language independent.

An Exemplary Procedure for Braille Image Pre-Processing

Figure 6:
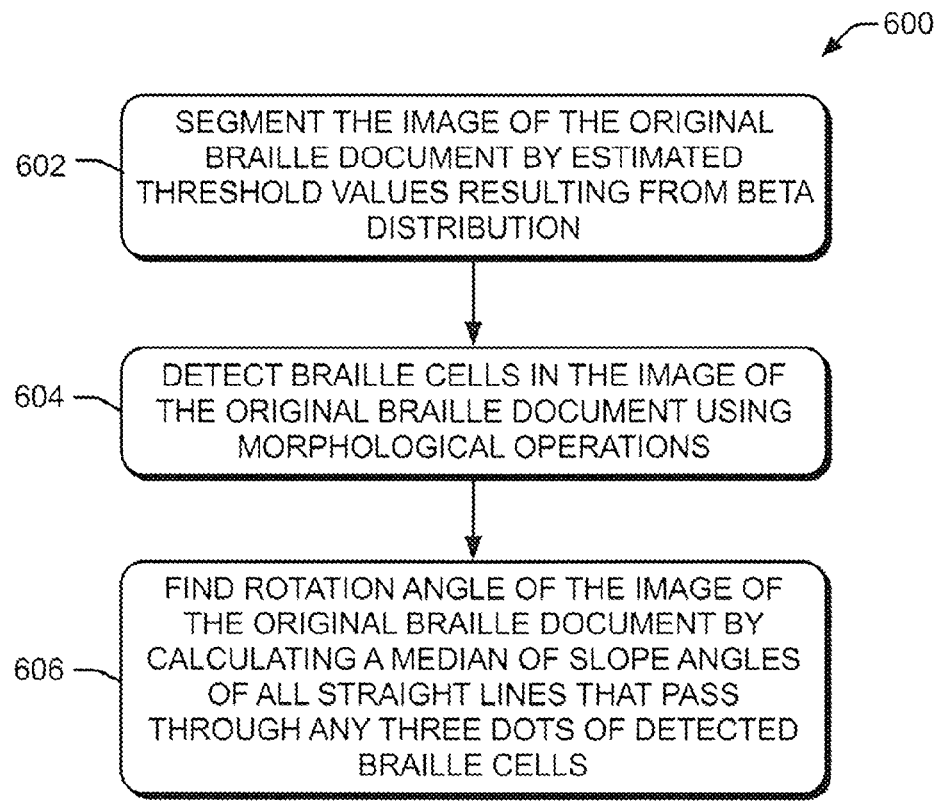
FIG. 6 shows an example procedure for detecting Braille dots and adjusting the skew of Braille image in a Braille image pre-processing stage to produce an extracted image of Braille dots, according to one embodiment.

FIG. 6 shows example procedure 600 for Braille image pre-process deskewing, according to one embodiment. In accordance with various implementations, skew of the scanned Braille document image may be corrected using approach 600 that includes three steps: (602) segmenting the Braille image by estimated thresholds values which are resulting from Beta distribution; (604) detecting the Braille cells using morphological operations; and (606) finding the rotation angle of Braille image by calculating the median of slope angles of all straight lines that pass through any three dots of detected Braille cells.

In particular, implementations of Braille image segmentation at 602 recognize that a scanned Braille image consists of three modes that represent three classes of pixels: mode 1 represents the dark region of a recto and verso dot; mode 2 represents the background; and mode 3 represents the light region of a recto and verso dot.

The present implementation assumes that the Braille document image scan is a combination of three Beta distributions. The Beta distribution is a continuous probability distribution with the Probability Density Function (PDF) defined on the interval [0, 1].

$$f(x, \alpha, \beta) = \frac{\Gamma(\alpha + \beta)}{\Gamma(\alpha)\,\Gamma(\beta)} x^{\alpha-1}(1-x)^{\beta-1}$$

where $\alpha$ and $\beta$ are the shape parameters of the distribution and is greater than zero, x is a random variable, and it is between 0 and 1. The Beta distribution can take different shapes depending on the values of its two parameters $\alpha$ and $\beta$. The histogram of a Braille image can be written as follows:

$$h(x) = p_1 f(x, \alpha_1, \beta_1) + p_2 f(x, \alpha_2, \beta_2) + p_3 f(x, \alpha_3, \beta_3)$$

The estimated threshold $T_i^{new}$ of a Braille image can be calculated using the following formula:

$$T_i^{new} = 1 - e^{\frac{-A - B\log(T_i^0)}{C}}$$

where, $\beta = \alpha_i - \alpha_{i+1}$, $C = \beta_i - \beta_{i+1}$, $K_r = \Gamma(\alpha_r - \beta_r)/\Gamma(\alpha_{r+1} - \beta_{r+1})$ and $r = i, i+1$ The statistical parameters of the histogram $(p_i, \alpha_i, \beta_i)$, $i=1, 2, 3$ are estimated using a stability of the thresholding algorithm.

The segmented Braille image resulting from 602 is used to detect a set of Braille cells in the scanned document at 604. To detect the Braille cells a dilation operation may be applied on the segmented Braille image to increase the sizes of distorted dots, filling in holes and broken areas, and connecting areas that are separated by spaces smaller than the size of the structuring element. Then, all dots and connected components that have area less than one half of the dpi resolution of the scan and greater than three times the dpi resolution of the scan are removed to remove the noise and undesirable components. This dilation operation may be applied two more times on the dilated segmented Braille image after removing the noise and undesirable components to merge the dots in cells as connected components. The objective of this step is to access any cell as a connected component, instead of accessing each dot on all cells and search for neighboring dots that are irregular due to the skew of the Braille page on the scanner. A bounding box localizes each of these connected components. This box will enable access to any cell on the dilated segmented Braille image that resulted from dilation. The x-axis and y-axis coordinates of the centers of the first and last dots for all Braille cells containing three dots on the same straight line are determined. Then, a line is drawn between the centers of these first and last dots. The resulting output of 604 is a set of Braille cells containing three dots on the same straight line.

The set of Braille cells $c_1, c_2, c_3, \ldots, c_n$ which contain three dots $d_1(x_1, y_1)$, $d_2(x_2, y_2)$ and $d_3(x_3, y_3)$ on the same straight line resulting from 604 are used to estimate the skew angle of the scanned Braille image at 606. Estimation of a skew angle for each Braille cell may be achieved by calculating the slope of the straight line between $d_1(x_1, y_1)$ and $d_3(x_3, y_3)$, where $d_2(x_2, y_2)$ is located in the middle for each detected Braille cell $c_1, c_2, c_3, \ldots, c_n$, using the following equation:

$$\tan(\theta) = m = -\frac{(y_2 - y_1)}{(x_2 - x_1)}$$

Then, the angle of each slope $m_1, m_2, m_3, \ldots, m_n$ can be calculated by the following equation:

$\theta = \tan^{-1}(m)$

The median of the calculated angles $(\theta_1, \theta_2, \theta_3, \ldots, \theta_n)$ is the estimated skew angle of the scanned Braille image.

Before calculating the slope of straight line for each Braille cell containing three dots, the segmented Braille image may be rotated by 90°, to determine if the scanned Braille image was rotated by 1° or −1°. This is done because some rotation angles of Braille image have the same estimation angle (i.e. the Braille image that is rotated by zero and one degree have the zero estimation angle) due to the effect of segmentation on the size of Braille dots that can lead to non-regular centers of Braille cells. The angle 90° is selected to correct the adjusted Braille image because most dots of Braille cells in this angle have the same x-axis. Therefore, if the adjusted Braille image is not rotated, the estimation skew angle will be the same angle 90°. After estimating the skew angle of the scanned Braille image, if this angle is 91° then the skew angle of the scanned Braille image is 1°. If the skew angle of Braille image is 89° then the skew angle of scanned Braille image is −1°. Otherwise, the skew angle of the scanned Braille image is the estimated angle.

An Exemplary Procedure for Braille Image Post-Processing

Figure 7A:
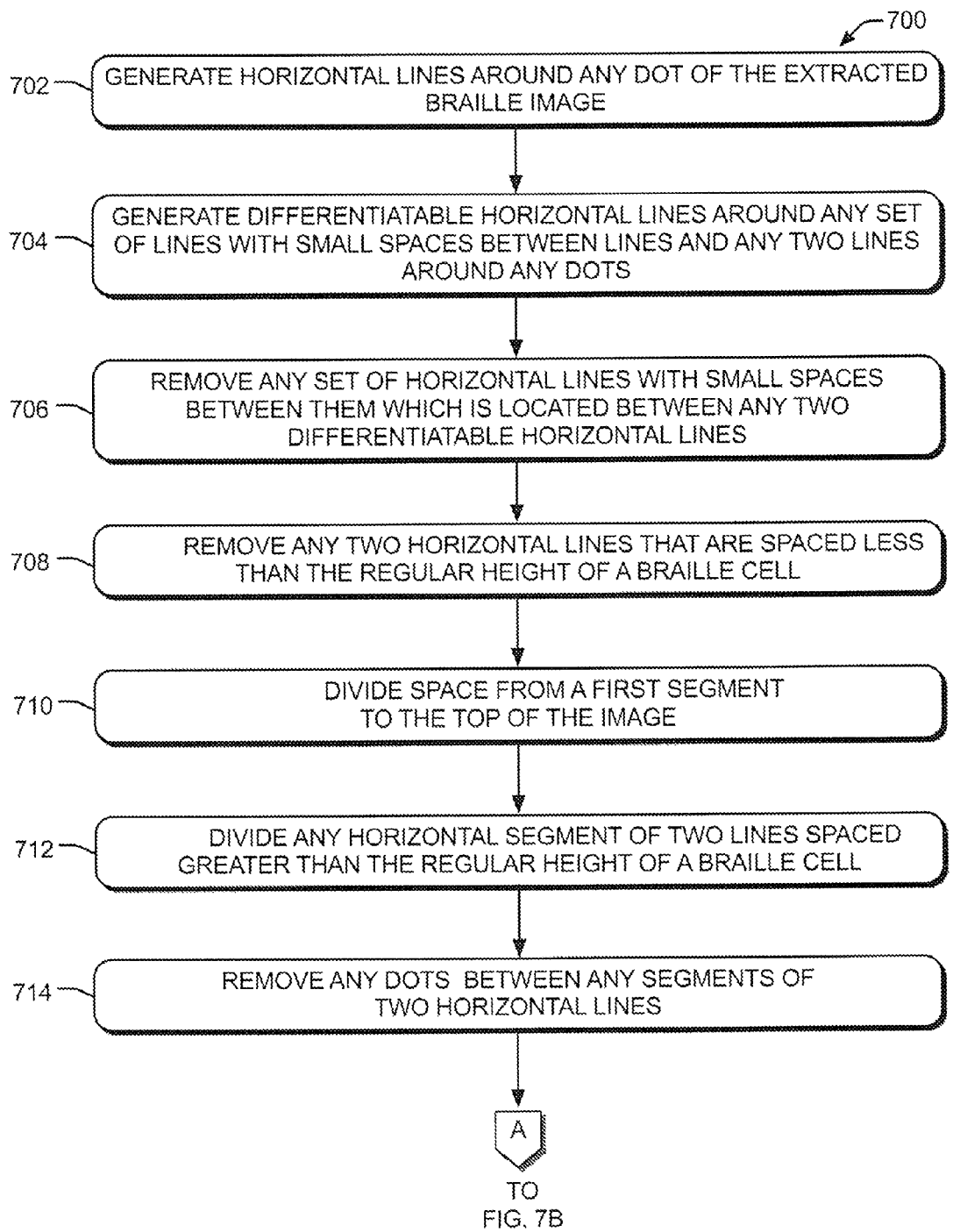
FIGS. 7A and 7B show an example procedure for Braille image post-processing, according to one embodiment.
Figure 7B:
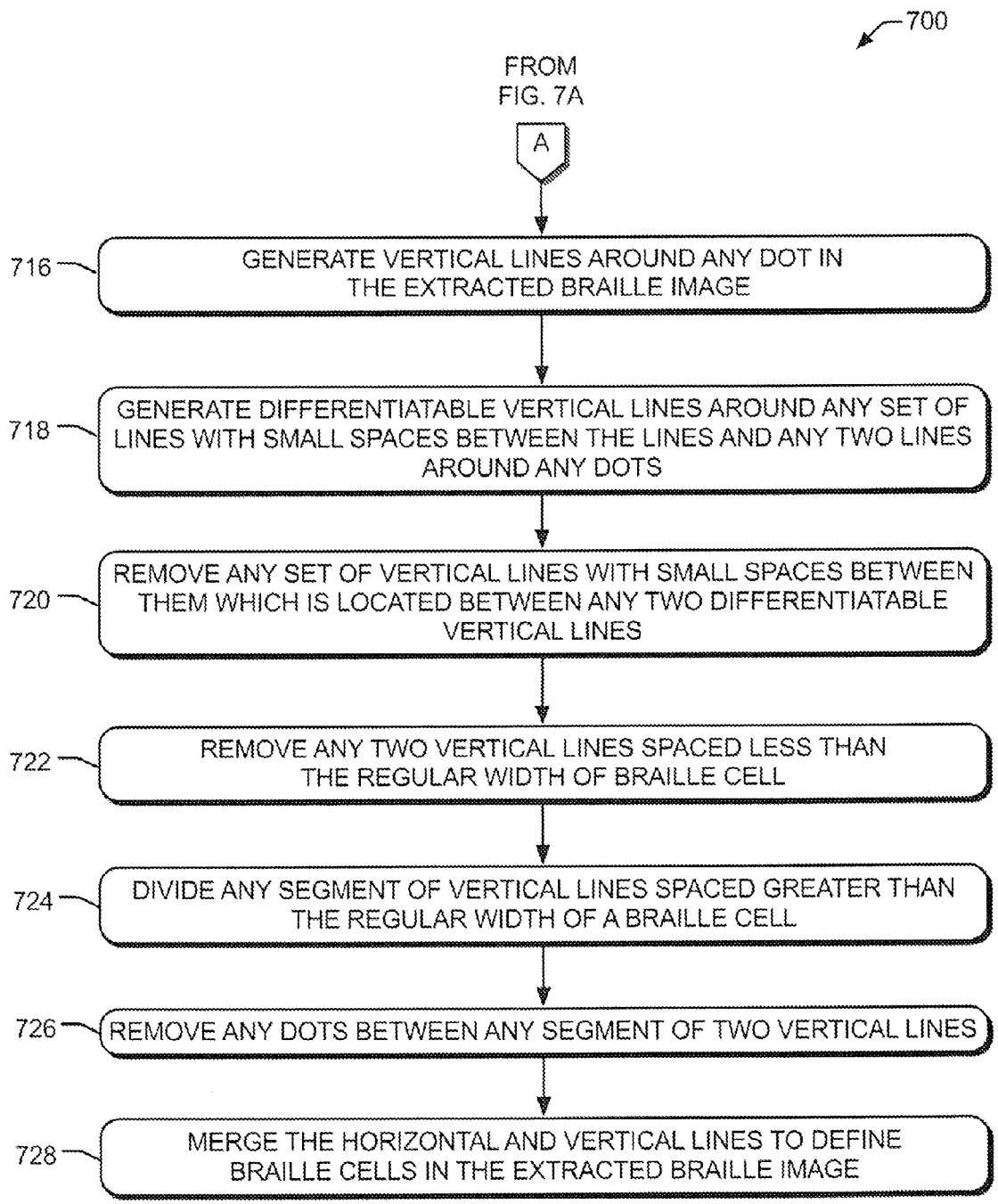

FIGS. 7A and 7B, together show example process 700 for Braille image post-processing, according to one embodiment. With initial attention directed to FIG. 7A, horizontal lines are generated around any dot in a first copy of the extracted Braille image at 702. At 704, differentiable horizontal lines, such as lines with different color or different line patterns, are generated around any set of lines from 702 with small spaces between lines and any two lines from 702 around any dots in the first copy of the extracted Braille image. At 706, any set of horizontal lines with small spaces between them, which is located between any differentiable horizontal lines in the first copy of the extracted Braille image is removed. Any two horizontal lines spaced less than the regular height of a Braille cell in the first copy of the extracted Braille image are removed at 708. At 710, the space from a first segment to the top of image in the first copy of the extracted Braille image is divided. Any horizontal segment of two lines spaced greater than the regular height of a Braille cell in the first copy of the extracted Braille image is divided at 712. At 714, any dots in the first copy of the extracted Braille image falling between segments of two horizontal lines are remove, as noise dots.

Turning to FIG. 7B, procedure 700 continues. At 716, vertical lines are generated around any dot in a second copy of the extracted Braille image. Differentiable vertical lines, such as lines with different color or different pattern, are generated around any set of lines from 716 that have small spaces between lines and any two lines around any dots in the second copy of the extracted Braille image at 718. At 720 any set of vertical lines with small spaces between them, which is located between any two differentiable vertical lines in the second copy of the extracted Braille image are removed. Any two vertical lines having a space smaller than the regular width of Braille cell between them in the second copy of the extracted Braille image is removed at 722. At 724, any segment of vertical lines having a space larger than the regular width of a Braille cell in the second copy of the extracted Braille image is re-divided and at 726 any dots between any segments of two vertical lines are removed, as noise dots, in the second copy of the extracted Braille image.

At 728 the remaining horizontal and vertical lines from the first and second copies of the extracted Braille image are merged to define Braille cells in the extracted Braille image.

Figure 8:
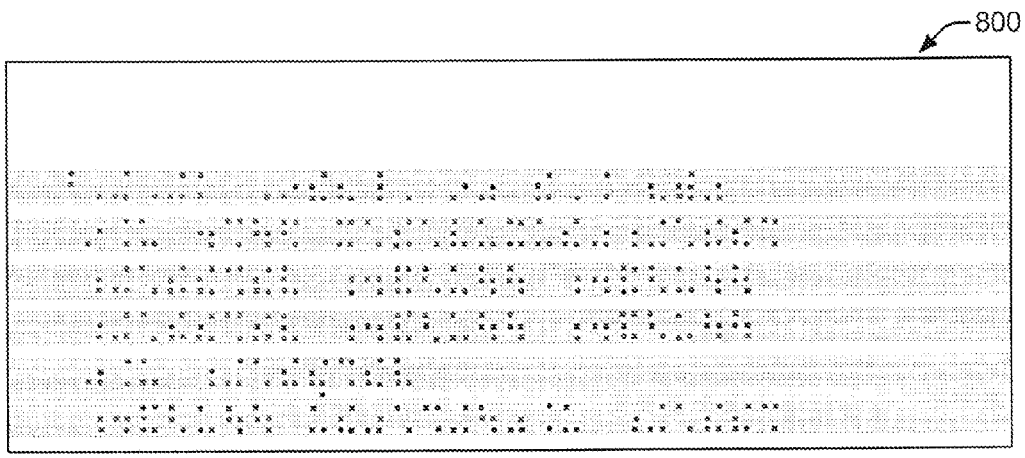
FIG. 8 shows an extracted Braille image after generating horizontal lines around any dot, according to one embodiment.

FIG. 8 shows extracted Braille image 800 after generating horizontal lines around any dot, according to one embodiment, such as in accordance with step 702 described above.

Figure 9:
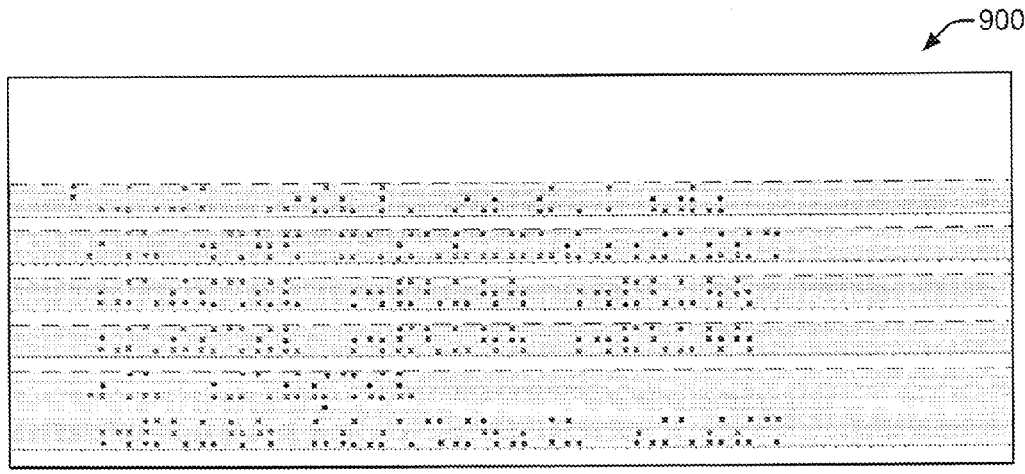
FIG. 9 shows the extracted Braille image after generating horizontal lines with different patterns around any set of lines with small spaces between lines or any two lines around any dots, according to one embodiment.

FIG. 9 shows extracted Braille image 900 after generating differentiable horizontal lines, shown in FIG. 9 as having different patterns, around any set of lines with small spaces between lines or any two lines around any dots, according to one embodiment, such as in accordance with step 704 described above.

Figure 10:
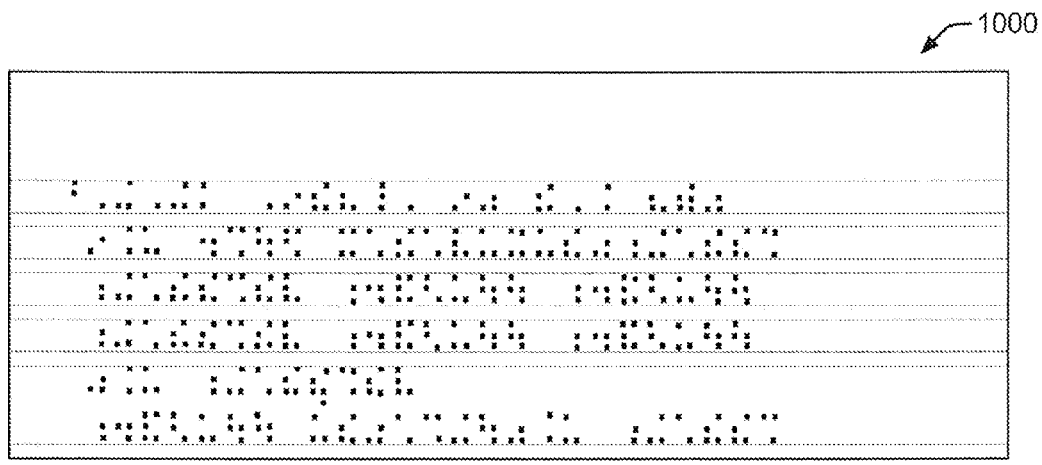
FIG. 10 shows the extracted Braille image after removing any set of lines with small spaces between them, which is located between any two lines having different patterns, according to one embodiment.

FIG. 10 shows extracted Braille image 1000 after removing any set of lines with small spaces between them, which is located between any two differentiable lines, such as the lines shown in FIG. 9 having different patterns, according to one embodiment, such as in accordance with step 706 described above.

Figure 11:
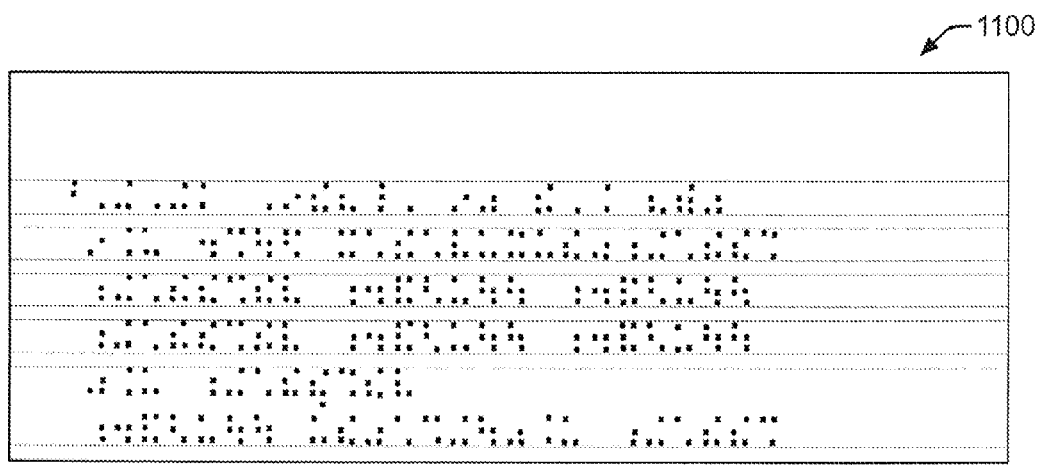
FIG. 11 shows the extracted Braille image after removing any two lines have space smaller than the regular height of Braille cell, according to one embodiment.

FIG. 11 shows extracted Braille image 1100 after removing any two lines have space smaller than the regular height of Braille cell (if found), according to one embodiment, such as in accordance with step 708 described above.

Figure 12:
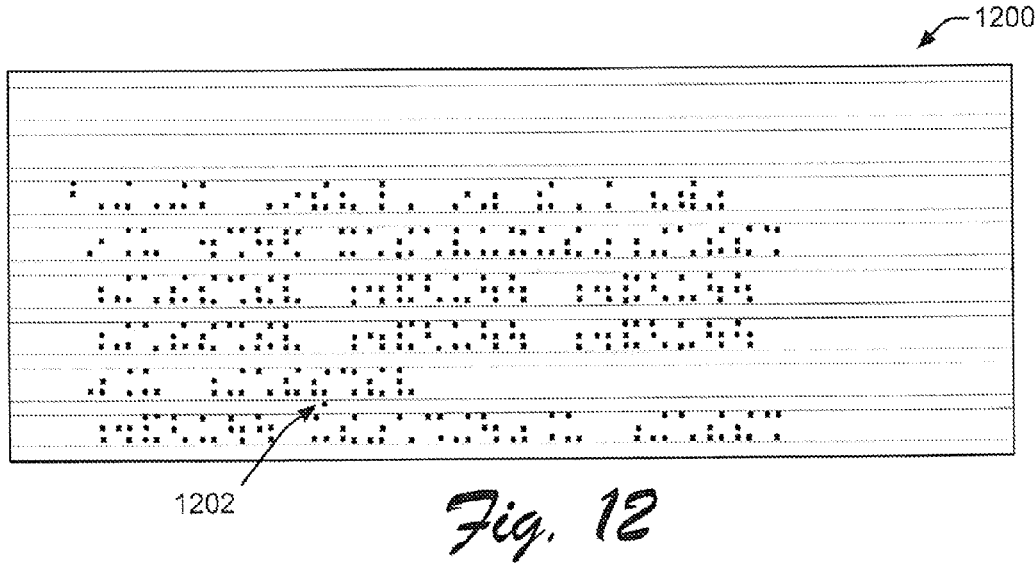
FIG. 12 shows the extracted Braille image after dividing it as horizontal segments of lines, according to one embodiment.

In accordance with step 712 described above, any horizontal segment of two lines that are spaced greater than the regular height of a Braille cell is divided, and at 710 the space from the first segment to the top of image is also divided as shown in FIG. 12. Thus, FIG. 12 shows extracted Braille image 1200 after dividing it as horizontal segments of lines, according to one embodiment, such as in accordance with steps 710 and 712 described above. Therein, noise dot 1202 can be seen between two line segments.

Figure 13:
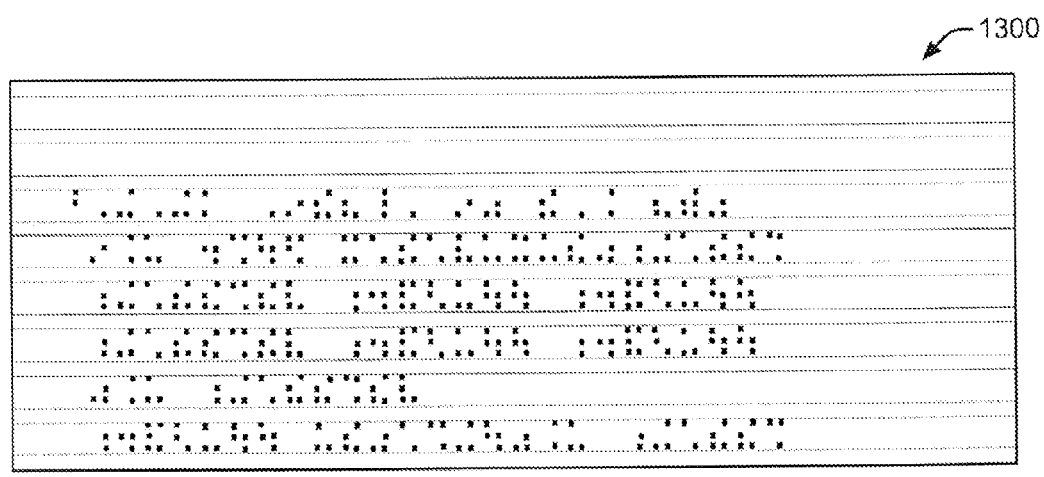
FIG. 13 shows the extracted Braille image after removing any noise dots between any segments of two horizontal lines, according to one embodiment.

FIG. 13 shows extracted Braille image 1300 after removing any noise dots, such as dot 1202 seen in FIG. 12, between any segments of two horizontal lines, according to one embodiment, such as in accordance with step 714 described above.

Figure 14:
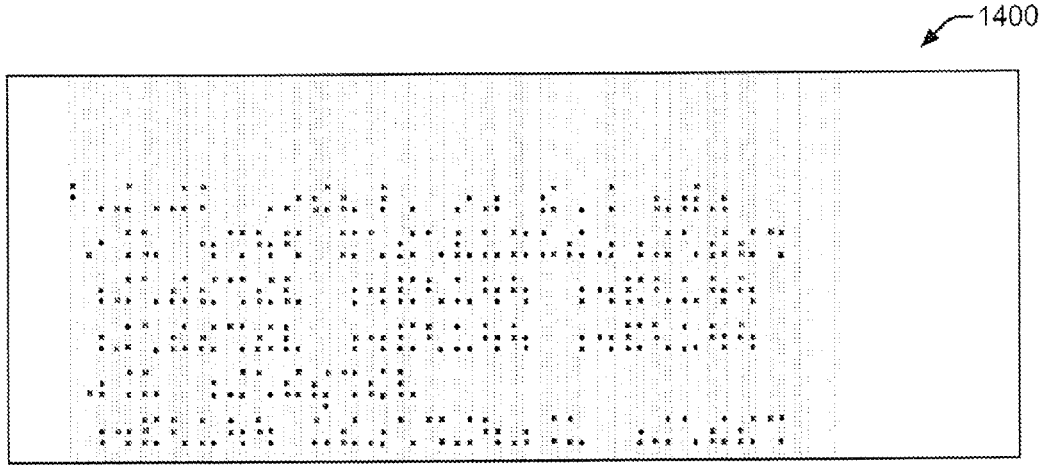
FIG. 14 shows the extracted Braille image after generating vertical lines around any dot, according to one embodiment.

FIG. 14 shows extracted Braille image 1400 after generating vertical lines around any dot, according to one embodiment, such as in accordance with step 716 described above.

Figure 15:
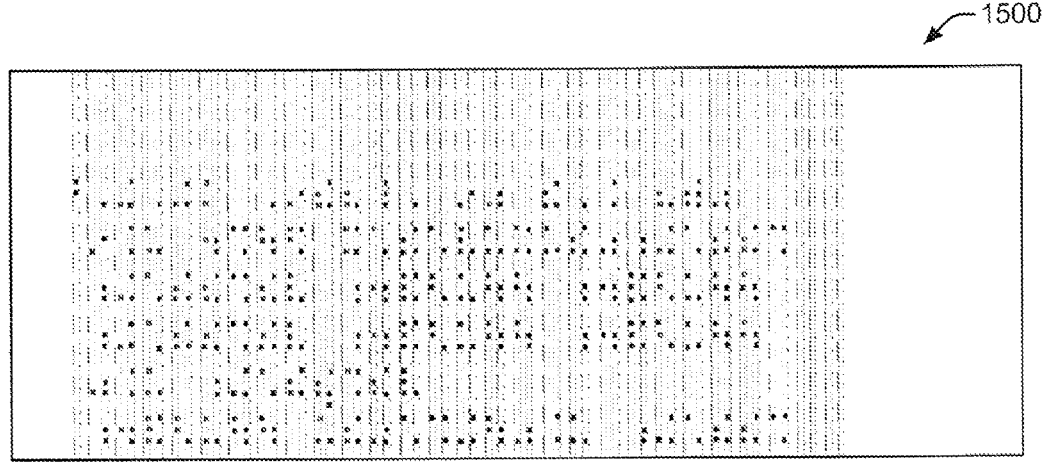
FIG. 15 shows the extracted Braille image after generating vertical lines with different patterns around any set of lines with small spaces between lines or any two lines around any dots, according to one embodiment.

FIG. 15 shows extracted Braille image 1500 after generating differentiable vertical lines, shown in FIG. 15 as having different patterns, around any set of lines with small spaces between lines or any two lines around any dots, according to one embodiment, such as in accordance with step 718 described above.

Figure 16:
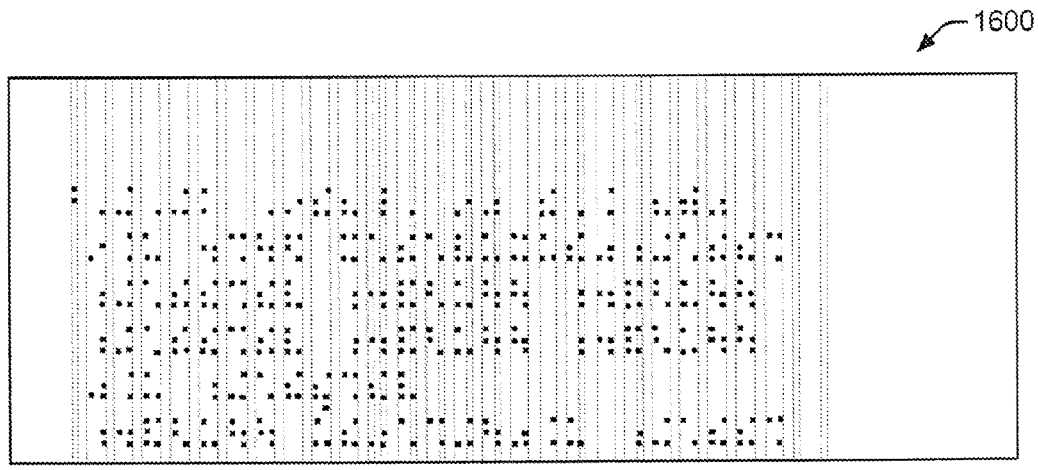
FIG. 16 shows the extracted Braille image after removing any set of lines with small spaces between them, which is located between any two lines having different patterns, according to one embodiment.

FIG. 16 shows extracted Braille image 1600 after removing any set of lines with small spaces between them, which is located between any two differentiable lines, such as shown in FIG. 15 as having different patterns, according to one embodiment, such as in accordance with step 720 described above.

Figure 17:
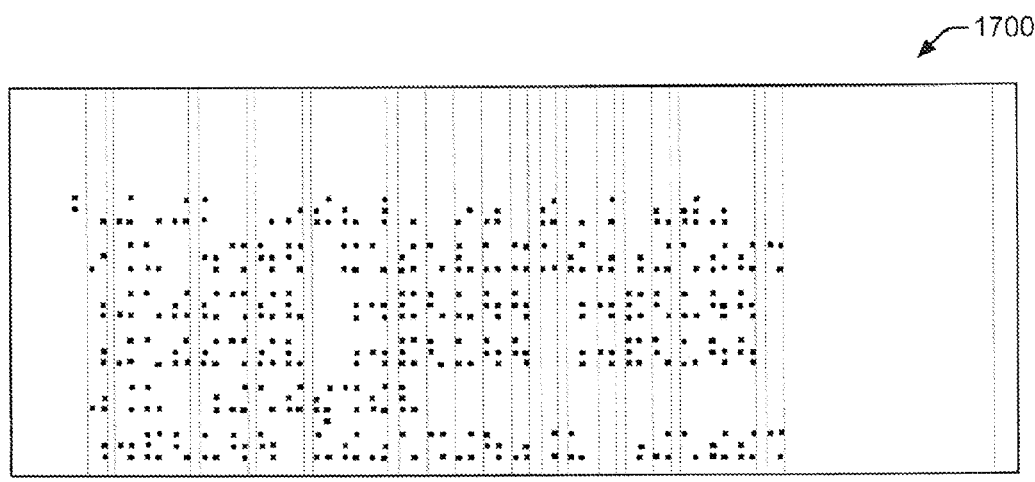
FIG. 17 shows the extracted Braille image after removing any two lines spaced closer than the regular width of Braille cell, according to one embodiment.

FIG. 17 shows extracted Braille image 1700 after removing any two lines spaced closer than the regular width of Braille cell, according to one embodiment, such as in accordance with step 722 described above.

Figure 18:
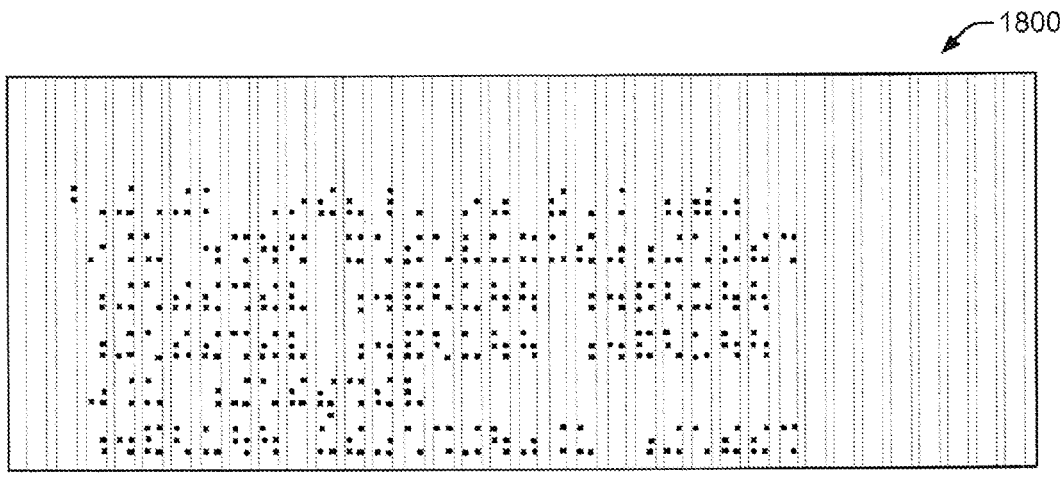
FIG. 18 shows the extracted Braille image after dividing any segment of vertical lines spaced greater than the regular width of Braille cell, according to one embodiment.

FIG. 18 shows extracted Braille image 1800 after dividing any segment of vertical lines spaced greater than the regular width of Braille cell, according to one embodiment, such as in accordance with step 724 described above.

Figure 19:
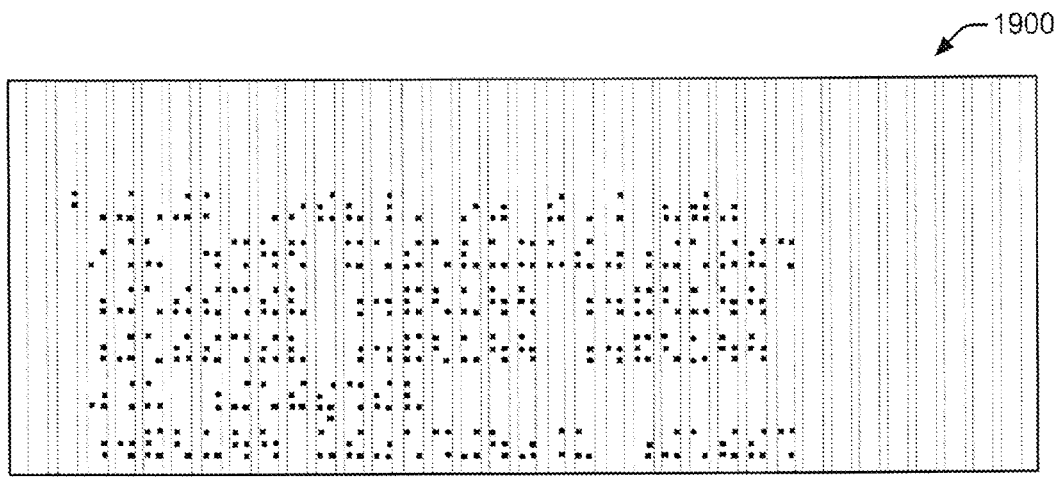
FIG. 19 shows the extracted Braille image after removing any noise dots between any segments of two vertical lines, according to one embodiment.

FIG. 19 shows extracted Braille image 1900 after removing any noise dots between any segments of two vertical lines, according to one embodiment, such as in accordance with step 726 described above.

Figure 20:
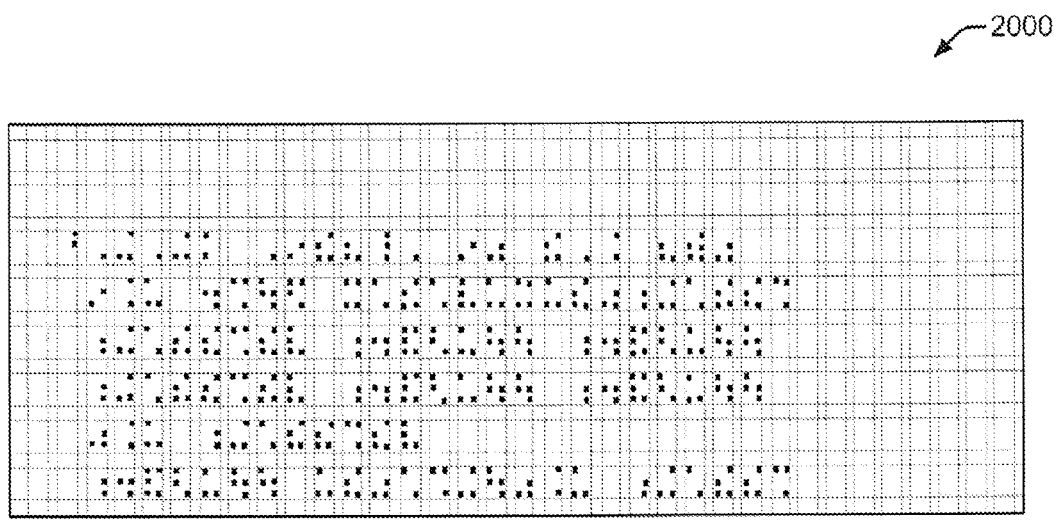
FIG. 20 shows the extracted Braille image after merging the horizontal and vertical lines, according to one embodiment.

FIG. 20 shows extracted Braille image 2000 after merging the horizontal and vertical lines, according to one embodiment, such as in accordance with step 728 described above.

CONCLUSION

Although Braille facsimile machine and image processing systems and methods have been described in language specific to structural features and/or methodological operations or actions, it is understood that the implementations defined in the appended claims are not necessarily limited to the specific features or actions described. Rather, the specific features and operation of the present Braille facsimile machine and image processing systems and methods are disclosed as exemplary forms of implementing the claimed subject matter.

The invention claimed is:

1. A facsimile machine implemented method comprising:
   scanning an original Braille document, obtaining an image of the original Braille document;
   processing the image of the original Braille document, producing an extracted Braille image and duplicating formatting of the original Braille document producing a copy of the original Braille document;
   sending the copy of the original Braille document, via a communications link;
   receiving the copy of the original Braille document; and
   printing the copy of the original Braille document;
   wherein the processing further comprises:
   generating horizontal lines around an instance of a dot in a first copy of the extracted Braille image;
   generating differentiable horizontal lines around an instance of a set of lines with small spaces between lines and an instance of two lines around an instance of dots in the first copy of the extracted Braille image;
   removing an instance of set of horizontal lines with small spaces between them that are located between an instance of two differentiable horizontal lines in the first copy of the extracted Braille image;
   removing an instance of two horizontal lines spaced less than the regular height of a Braille cell in the first copy of the extracted Braille image;
   dividing space from a first segment to the top of the first copy of the extracted Braille image;
   dividing an instance of a horizontal segment of two lines spaced greater than the regular height of a Braille cell in the first copy of the extracted Braille image;
   removing an instance of dots between an instance of segments of two horizontal lines in the first copy of the extracted Braille image;
   generating vertical lines around an instance of a dot in a second copy of the extracted Braille image;

generating differentiable vertical lines around an instance of a set of lines with small spaces between lines and an instance of two lines around an instance of dots in the second copy of the extracted Braille image;

removing an instance of a set of vertical lines with small space between them, which is located between an instance of two differentiable vertical lines in the second copy of the extracted Braille image;

removing an instance of two vertical lines having spaced less than the regular width of a Braille cell in the second copy of the extracted Braille image;

dividing an instance of segment of vertical lines having space larger than the regular width of a Braille cell in the second copy of the extracted Braille image;

removing an instance of dots between an instance of segments of two vertical lines in the second copy of the extracted Braille image;

merging horizontal and vertical lines from the first and second copies of the extracted Braille image to define Braille cells in the extracted Braille image.

2. The method of claim 1, wherein the original Braille document is two sided, the scanning comprises producing an image reflecting both sides of the original Braille document, and the processing further comprises duplicating formatting of each side of the original Braille document to produce a copy of the original Braille document.

3. The method of claim 1, wherein the processing further comprises:
pre-processing the image of the original Braille document, producing the extracted Braille image; and
post-processing the extracted Braille image, duplicating formatting of the original Braille document producing the copy of the original Braille document.

4. The method of claim 1, wherein the processing further comprises:
pre-processing the image of the original Braille document, by a first facsimile machine, producing the extracted Braille image, prior to sending; and
post-processing the extracted Braille image, by a second facsimile machine after receiving, duplicating formatting of the original Braille document producing the copy of the original Braille document.

5. The method of claim 1, wherein the scanning, the processing, and the sending are carried out by a first facsimile machine, and the receiving and the printing are carried out by a second facsimile machine.

6. The method of claim 1, wherein the copy of the original Braille document produced by the processing comprises ASCII Braille codes.

7. The method of claim 1, wherein the sending and receiving are carried out via one of a telecommunications link and a data network link.

8. The method of claim 1, wherein the processing further comprises deskewing the image of the original Braille document, the deskewing comprising:
segmenting the image of the original Braille document by estimated thresholds values resulting from Beta distribution;
detecting Braille cells in the image of the original Braille document using morphological operations; and finding rotation angle of the image of the original Braille document by calculating a median of slope angles of all straight lines that pass through an instance of three dots of detected Braille cells.

9. The method of claim 1, wherein the processing further comprises detecting Braille cells in the extracted Braille image by generating horizontal and vertical lines based on dots in the extracted Braille image.

10. A facsimile machine implemented method comprising:
scanning an original Braille document by a first facsimile machine, obtaining an image of the original Braille document;
pre-processing the image of the original Braille document by the first facsimile machine,
producing an extracted Braille image; sending a facsimile of the extracted Braille image by the first facsimile machine, via a communications link;
receiving the facsimile of the extracted Braille image, via the communications link, by a second facsimile machine;
post-processing the extracted Braille image by the second facsimile machine, duplicating formatting of the original Braille document producing a copy of the original Braille document; and
printing the copy of the original Braille document by the second facsimile machine;
wherein the post-processing further comprises:
generating horizontal lines around an instance of a dot in a first copy of the extracted Braille image;
generating differentiable horizontal lines around an instance of a set of lines with small spaces between lines and an instance of two lines around an instance of dots in the first copy of the extracted Braille image;
removing an instance of a set of horizontal lines with small spaces between them, which is located between an instance of two differentiable horizontal lines in the first copy of the extracted Braille image;
removing an instance of two horizontal lines spaced less than the regular height of a Braille cell in the first copy of the extracted Braille image;
dividing space from a first segment to the top of the first copy of the extracted Braille image;
dividing an instance of a horizontal segment of two lines spaced greater than the regular height of a Braille cell in the first copy of the extracted Braille image;
removing an instance of dots between an instance of segments of two horizontal lines in the first copy of the extracted Braille image;
generating vertical lines around an instance of a dot in a second copy of the extracted Braille image;
generating differentiable vertical lines around an instance of a set of lines with small spaces between lines and an instance of two lines around an instance of dots in the second copy of the extracted Braille image;
removing an instance of a set of vertical lines with small space between them, which is located between an instance of two differentiable vertical lines in the second copy of the extracted Braille image;
removing an instance of two vertical lines having spaced less than the regular width of a Braille cell in the second copy of the extracted Braille image;
dividing an instance of segment of vertical lines having space larger than the regular width of a Braille cell in the second copy of the extracted Braille image;
removing an instance of dots between an instance of segments of two vertical lines in the second copy of the extracted Braille image;
merging horizontal and vertical lines from the first and second copies of the extracted Braille image to define Braille cells in the extracted Braille image.

11. The facsimile machine of claim 10, wherein the original Braille document is two sided, the scanning comprises producing an image reflecting both sides of the original Braille document, and the post-processing further comprises duplicating formatting of each side of the original Braille document to produce a copy of the original Braille document.

12. The facsimile machine of claim 10, wherein the pre-processing further comprises deskewing the image of the original Braille document, the deskewing comprising:
   segmenting the image of the original Braille document by estimated thresholds values resulting from Beta distribution;
   detecting Braille cells in the image of the original Braille document using morphological operations; and
   finding rotation angle of the image of the original Braille document by calculating a median of slope angles of all straight lines that pass through an instance of three dots of detected Braille cells.

13. The facsimile machine of claim 10, wherein the post-processing further comprises detecting Braille cells in the extracted Braille image by generating horizontal and vertical lines based on dots in the extracted Braille image.

14. A Braille-to-Braille facsimile machine operatively couple to an image scanner, a Braille printer, and a communications link, the Braille-to-Braille facsimile machine comprising:
   a main image processing board, operatively coupled to the image scanner, the Braille printer and the communications link, the main image processing board including one or more respective processors operatively coupled to respective memory, each memory comprising computer program instructions executable by a processor to implement a method for Braille-to Braille facsimile comprising:
      scanning an outgoing Braille document using the image scanner to obtain an image of the Braille document;
      processing the image of the Braille document, producing an extracted Braille image and processing an extracted Braille image to duplicate formatting of the Braille document to produce a copy of the Braille document;
      sending the extracted Braille image or the copy of the Braille document, via the communications link;
      receiving an extracted Braille image or a copy of a Braille document, via the communications link; and
      printing the copy of the Braille document;
   wherein the processing further comprises:
      generating horizontal lines around an instance of a dot in a first copy of the extracted Braille image;
      generating differentiable horizontal lines around an instance of a set of lines with small spaces between lines and an instance of two lines around dots in the first copy of the extracted Braille image;
      removing an instance of a set of horizontal lines with small spaces between them, which is located between an instance of two differentiable horizontal lines in the first copy of the extracted Braille image;
      removing an instance of two horizontal lines spaced less than the regular height of a Braille cell in the first copy of the extracted Braille image;
      dividing space from a first segment to the top of image in the first copy of the extracted Braille image;
      dividing an instance of a horizontal segment of two lines spaced greater than the regular height of a Braille cell in the first copy of the extracted Braille image;
      removing an instance of dots between an instance of segments of two horizontal lines in the first copy of the extracted Braille image;
      generating vertical lines around an instance of a dot in a second copy of the extracted Braille image;
      generating differentiable vertical lines around an instance of a set of lines with small spaces between lines and an instance of two lines around dots in the second copy of the extracted Braille image;
      removing an instance of set of vertical lines with small spaces between them, which is located between two differentiable vertical lines in the second copy of the extracted Braille image;
      removing an instance of two vertical lines spaced less than the regular width of a Braille cell in the second copy of the extracted Braille image; dividing an instance of a segment of vertical lines spaced greater than the regular width of a Braille cell in the second copy of the extracted Braille image;
      removing an instance of dots between an instance of a segment of two vertical lines in the second copy of the extracted Braille image; and
      merging horizontal and vertical lines from the first and second copies of the extracted Braille image to define Braille cells in the extracted Braille image.

15. The Braille-to-Braille facsimile machine of claim 14, wherein the Braille document is two sided and the scanning comprises producing an image reflecting both sides of the Braille document and the processing an extracted Braille image further comprises duplicating formatting of each side of the Braille document to produce a copy of the Braille document.

16. The Braille-to-Braille facsimile machine of claim 14, wherein the processing further comprises deskewing the image of the Braille document, the deskewing comprising:
   segmenting the image of the Braille document by estimated thresholds values resulting from Beta distribution;
   detecting Braille cells in the image of the Braille document using morphological operations; and
   finding rotation angle of the image of the Braille document by calculating a median of slope angles of all straight lines that pass through any three dots of detected Braille cells.

17. The Braille-to-Braille facsimile machine of claim 14, wherein the processing an extracted Braille image further comprises detecting Braille cells in the extracted Braille image by generating horizontal and vertical lines based on dots in the extracted Braille image.

* * * * *